US008477640B2

(12) United States Patent
Zhong et al.

(10) Patent No.: US 8,477,640 B2
(45) Date of Patent: Jul. 2, 2013

(54) METHOD, APPARATUS AND SYSTEM FOR INFORMATION TRANSMISSION

(75) Inventors: Yongfeng Zhong, Shenzhen (CN); Ling Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 988 days.

(21) Appl. No.: 12/359,028

(22) Filed: Jan. 23, 2009

(65) Prior Publication Data

US 2009/0129356 A1 May 21, 2009

Related U.S. Application Data

(63) Continuation of application No. PCT/CN2007/070352, filed on Jul. 25, 2007.

(30) Foreign Application Priority Data

Jul. 25, 2006 (CN) .......................... 2006 1 0061810

(51) Int. Cl.
*G01R 31/08* (2006.01)

(52) U.S. Cl.
USPC ....................................... 370/252; 455/426.1

(58) Field of Classification Search
USPC ................................ 370/328, 252; 455/426.1
See application file for complete search history.

(56) References Cited

U.S. PATENT DOCUMENTS 7,860,039 B2 * 12/2010 Lee et al. ...................... 370/312
2002/0187746 A1 * 12/2002 Cheng et al. ................. 455/11.1
2004/0246983 A1 12/2004 Kaatz
2006/0094366 A1 * 5/2006 Cho et al. ................... 455/67.11
2006/0193315 A1 8/2006 Sinivaara et al.
2006/0278702 A1 * 12/2006 Sakai ............................ 235/382
2007/0110061 A1 5/2007 Sisodia et al.

FOREIGN PATENT DOCUMENTS

CN 1630422 A 6/2005
WO WO 2004/111763 A2 12/2004
WO WO 2005/006658 A1 1/2005
WO WO 2005/064853 A1 7/2005

OTHER PUBLICATIONS

Written Opinion of the International Searching Authority in corresponding PCT Application No. PCT/CN2007/070352 (Nov. 8, 2007).
International Search Report in corresponding PCT Application No. PCT/CN2007/070352 (Nov. 8, 2007).

(Continued)

*Primary Examiner* — Sai-Ming Chan
(74) *Attorney, Agent, or Firm* — Leydig, Voit & Mayer, Ltd.

(57) ABSTRACT

A method, an apparatus and a system for information transmission are provided. The method includes the following steps. A second user equipment receives update information issued by a wireless access point (AP). The second user equipment is located within a coverage area of the wireless AP. After detecting that the second user equipment has the update information, a first user equipment establishes a connection with the second user equipment and obtains the update information from the second user equipment. The first user equipment is located outside the coverage area of the wireless AP. In the present invention, the user equipment can update the information without additionally increasing the transmit powers of the wireless AP and the user equipments when located outside the coverage area of the wireless AP, and thus the interference to other equipments is minimized.

15 Claims, 4 Drawing Sheets

40

Wireless Transceiver Unit — 41

Message Broadcast Unit — 42

OTHER PUBLICATIONS

1st Office Action of Chinese Application No. 200610061810.3 (May 25, 2011).

2nd Office Action of Chinese Application No. 200610061810.3 (Dec. 6, 2011).

* cited by examiner

METHOD, APPARATUS AND SYSTEM FOR INFORMATION TRANSMISSION

CROSS-REFERENCE TO RELATED APPLICATIONS

This application is a continuation of International Patent Application No. PCT/CN2007/070352, filed Jul. 25, 2007, which claims the priority to Chinese Patent Application No. 200610061810.3, filed Jul. 25, 2006, of which are hereby incorporated by reference in their entirety.

FIELD OF THE INVENTION

The present invention relates to the field of short-distance communication technology, and more particularly to a method, an apparatus and a system for information transmission.

BACKGROUND

Technologies such as 802.1 1/Wi-Fi, Bluetooth, ad hoc network, and mesh network play an important role in the wireless local area network (WLAN) communication. As compared with a cellular mobile communication network, a WLAN has a small coverage area, a low power consumption and a high transmission rate, and usually adopts a star or mesh topology. A wireless access point (AP) is connected to a backbone network as a network center, and a user equipment obtains resources from a wireless AP to which it belongs as an access equipment.

The wireless AP is responsible for managing a mobile user equipment, storing and forwarding information, and coordinating communication with the backbone network, and also undertakes a task of issuing information, i.e., issuing information to the user equipment in time when the user equipment is located in a coverage area of the wireless AP. The information issuing service does not need to be strictly real-time (for example, a non-voice service), but requires the information of the user equipment to be updated as quickly as possible.

Since the coverage area of the wireless AP is limited, a user equipment outside the coverage area of the wireless AP cannot obtain the issued update information. To solve this problem, in a first applicable technical solution as shown in FIG. 1, the user equipment must be close enough to the AP, that is, a user equipment 15 moves towards a wireless AP 10. In a second applicable technical solution, the transmit power of the wireless AP and the user equipment is increased to enlarge the signal propagation distance. As shown in FIG. 2, a wireless AP has an original coverage area 201, and has a coverage area 202 after the transmit power is increased, and meanwhile the transmit powers of user equipments within the coverage area also need to be increased. However, the above technical solutions both increase the signal interference among the user equipments, resulting in a degradation in communication quality.

SUMMARY

Accordingly, the present embodiment is directed to a method, an apparatus and a system for information transmission, so as to enable a user equipment outside a coverage area of a wireless access point (AP) to obtain update information in time.

An information transmission method is provided, which includes the following steps. A second user equipment receives update information issued by a wireless AP. The second user equipment is located in a coverage area of the wireless AP. After detecting that the second user equipment has the update information, a first user equipment establishes a connection with the second user equipment and obtains the update information from the second user equipment. A wireless AP of the first user equipment is located outside the coverage area of the wireless AP.

A user equipment is provided, which includes a wireless transceiver unit and a message broadcast unit. The wireless transceiver unit is configured to receive and send a message. The message broadcast unit is configured to periodically generate a broadcast beacon message and send out the broadcast beacon message via the wireless transceiver unit.

A user equipment is further provided, which includes a wireless transceiver unit, a detecting unit, and an information update unit. The wireless transceiver unit is configured to receive and send a message. The detecting unit is configured to detect whether an information identification received by the wireless transceiver unit in a beacon message broadcasted by other user equipment is identical to an information identification of the current user equipment or not. The information update unit is configured to receive update information sent by the other user equipment when the detecting unit detects that the information identifications are different.

An information transmission system is provided, which includes a first user equipment and a second user equipment. The first user equipment includes a first wireless transceiver unit and a message broadcast unit. The message broadcast unit is configured to periodically broadcast a beacon message. The second user equipment includes a second wireless transceiver unit, a detecting unit, a connection establishing unit, and an information update unit. The detecting unit is configured to detect whether an information identification in a beacon message received by the second wireless transceiver unit that is broadcasted by other user equipment is identical to an information identification of the second user equipment or not. The connection establishing unit is configured to establish a connection with the other user equipment when the detecting unit detects that the information identifications are different. The information update unit is configured to receive update information sent by the other user equipment through the connection.

An information transmission system is further provided, which includes a wireless AP and a user equipment located in a coverage area of the wireless AP. The user equipment includes a wireless transceiver unit and a message broadcast unit. The wireless transceiver unit is configured to receive and send a message. The message broadcast unit is configured to periodically generate a broadcast beacon message and send out the broadcast beacon message via the wireless transceiver unit.

The user equipments periodically broadcast beacon messages to each other. Each user equipment extracts information identification information from a broadcast beacon message, and compares the information identification information with an information identification thereof, so as to update information of the user equipment. Through the method of the present embodiment, the user equipment outside the coverage area of the wireless AP can obtain the update information issued by the wireless AP in time.

At the same time, with the present embodiment, the user equipment can update the information without additionally increasing the transmit powers of the wireless AP and the user equipment, and thus the interference to other user equipments is not increased.

DETAILED DESCRIPTION

In the present embodiment, all user equipments periodically broadcast beacon messages. Each user equipment extracts information identification information from a received beacon message, compares the information identification information with an information identification thereof, and establishes a connection with a neighboring user equipment and receives an update message if determining that the neighboring user equipment has the update message.

The present invention is described below in further detail with reference to accompanying drawings and embodiments.

Figure 1:
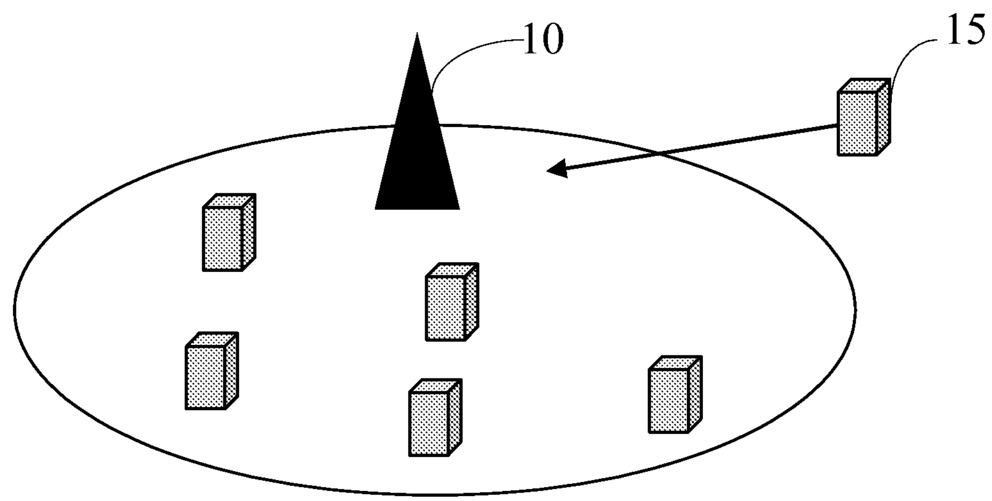
FIG. 1 is a schematic view illustrating a technical solution for enabling a user equipment to obtain information.
Figure 2:
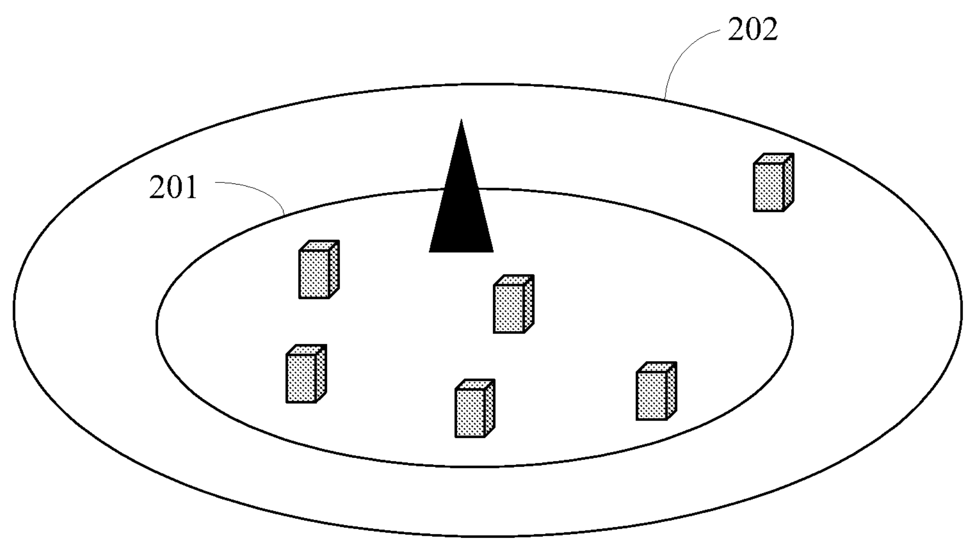
FIG. 2 is a schematic view illustrating another technical solution for enabling a user equipment to obtain information.
Figure 3:
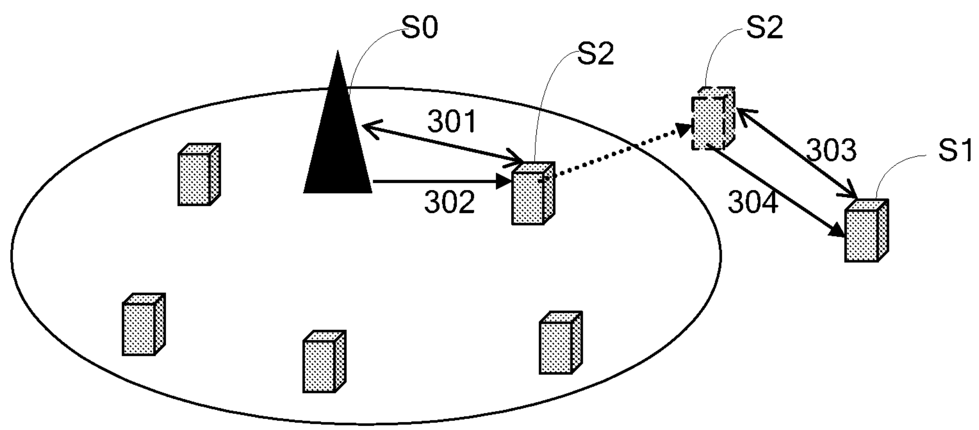
FIG. 3 is a schematic view illustrating a method for enabling a user equipment to obtain information according to an embodiment of the present invention.

In an embodiment as shown in FIG. 3, a user equipment S1 is located outside a coverage area of a wireless access point (AP) S0, and a user equipment S2 is located in the coverage area of the wireless AP S0. A process for the user equipment S1 to obtain update information specifically includes the following steps.

In step 301, the wireless AP S0 issues update information through an information update broadcast, for example, broadcasts a beacon message to user equipments within the coverage area of the wireless AP S0. The beacon message is a special control information frame sent through broadcasting, indicating that new information is issued, and contains an information identification, which is used to distinguish different update information. The user equipment S2 establishes a connection with the wireless AP S0 when the information identification in the beacon message broadcasted by the wireless access point S0 is different from an information identification stored in the user equipment S2. A user of the user equipment S2 may be reminded by voice or display to select whether to update the information identification stored in the user equipment S2 or not, before the user equipment S2 establishes a connection with the wireless AP S0 if the user equipment S2 detects that the information identification of the beacon message broadcasted by the wireless AP S0 is different from the information identification stored therein. If the user selects to update the information identification stored therein, a connection is established between the user equipment S2 and the wireless AP S0; otherwise, no connection is established.

A method for the user equipment S2 to establish a connection with the wireless AP S0 is that the user equipment S2 may obtain channel resources by applying to the wireless AP S0, thereby establishing a connection with the wireless AP S0, and may also obtain channel resources through competition, thereby establishing a connection with the wireless AP S0.

In step 302, the user equipment S2 receives the update information through the connection with the wireless AP S0.

In step 303, the user equipment S2 broadcasts a beacon message, and the user equipment S1 receives the beacon message broadcasted by the user equipment S2 and extracts an information identification from the beacon message. The information identification is compared with the latest information identification stored in the user equipment S1. If the comparison result shows that the information identifications are different, which means that the user equipment S2 has the update information, the user equipment S1 establishes a temporary connection with the user equipment S2.

The period for the user equipment to broadcast a beacon message may depend on the network size, and different periods may also be set within and outside the coverage area of the wireless AP.

The information identification may be an identification for distinguishing different information in an actual network, such as an information number and a time stamp.

If the information identification is an information number, the value of the information number is used to determine whether it is the update information or not. The information number will be reset to zero after reaching a maximum value.

For example, provided that the information identification of the user equipment S1 is X, and the information identification of the user equipment S2 is Y, a judgment rule is as follows.

If $X<Y$ and $|Y-X|<T$, the information of the user equipment S1 needs to be updated.

If $X<Y$ and $|Y-X|\geqq T$, the information of the user equipment S1 does not need to be updated.

If $X\geqq Y$ and $|Y-X|\leqq T$, the information of the user equipment S1 does not need to be updated.

If $X\geqq Y$ and $|Y-X|>T$, the information of the user equipment S1 needs to be updated.

T is a preset value, in order to avoid that when the update information number is smaller than information numbers stored in some user equipments because the information number reaches the maximum value and is recounted, the information of these user equipments cannot be updated. The value of T may depend on the network size, the frequency of issuing information and the like, and may be set to, for example, ⅔, ½, or ⅓ of the maximum value of the information number.

If the information identification is a time stamp, the principles of judging the update information are the same as those of the information number. In step 304, the user equipment S1 obtains the update information from the user equipment S2 by the established temporary connection.

The user equipment S2 may also actively establish a connection with the user equipment S1 and send the update message to the user equipment S1 when the user equipment S2 finds that the information of the user equipment S1 is out of date through the beacon message broadcasted by the user equipment S1.

In the information transmission method according to this embodiment of the present invention, all user equipments, either outside or within the coverage area of the wireless AP, periodically broadcast beacon messages. Each user equipment extracts information identification information from a received beacon message, compares the information identification information with an information identification thereof, and establishes a connection with a neighboring user equipment and receives an update message if determining that the neighboring user equipment has the update message.

Therefore, the user equipment outside the coverage area of the wireless AP can obtain the update information issued by the wireless AP in time without additionally increasing the transmit powers of the wireless AP and the user equipment, and thus the interference to other user equipments is not increased.

In the present embodiment, the user equipment includes a wireless transceiver unit and a message broadcast unit, and may further include a detecting unit and an information update unit.

The wireless transceiver unit is configured to receive and send data; and the message broadcast unit is adapted to broadcast a beacon message of the user equipment. The beacon message includes an information identification of the user equipment. The detecting unit is configured to extract an information identification from a beacon message broadcasted by other user equipment, compares the information identification with the information identification of the current equipment, and notifies the information update unit to update the information when finding that the information needs to be updated. The information update unit establishes a connection with the equipment having the update information and receives the update information when the detecting unit finds that the information needs to be updated.

Figure 4:
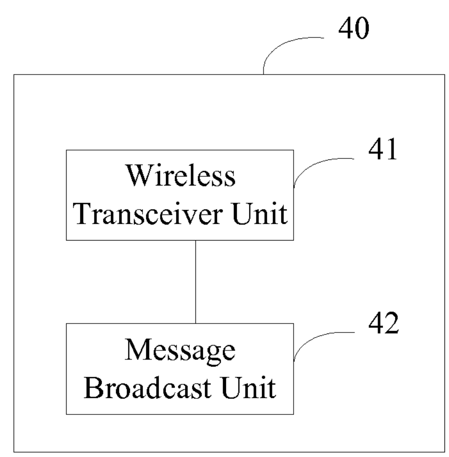
FIG. 4 is a block diagram showing the principles of a user equipment according to a first embodiment of the present invention.

FIG. 4 is a block diagram showing the principles of a user equipment according to a first embodiment of the present invention.

In this embodiment, the user equipment 40 includes a wireless transceiver unit 41 and a message broadcast unit 42. The wireless transceiver unit 41 is configured to receive and send a message. The message broadcast unit 42 is configured to periodically generate a broadcast beacon message and send out the broadcast beacon message via the wireless transceiver unit 41.

Figure 5:
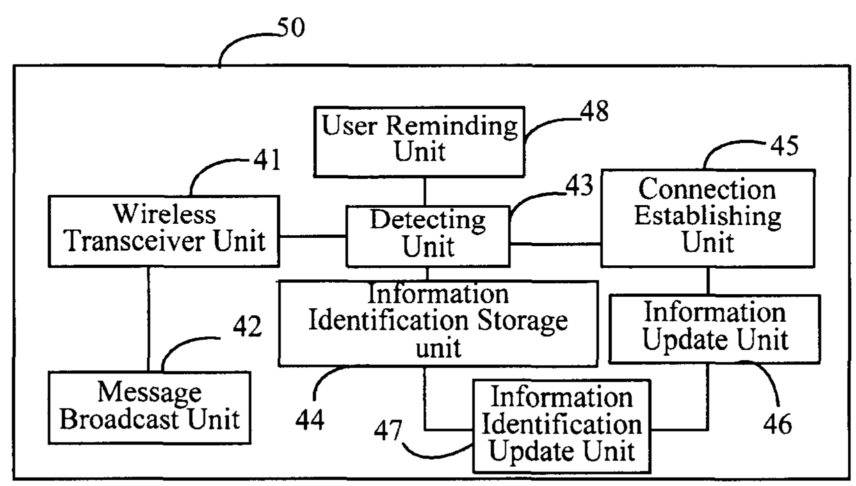
FIG. 5 is a block diagram showing the principles of a user equipment according to a second embodiment of the present invention.

FIG. 5 is a block diagram showing the principles of a user equipment according to a second embodiment of the present invention.

Unlike the embodiment as shown in FIG. 4, in this embodiment, in order to enable the user equipment to update the information thereof in time, an information identification storage unit 44, a detecting unit 43, a connection establishing unit 45, and an information update unit 46 are further disposed in a user equipment 50. The information identification storage unit 44 is configured to store the information identification of the user equipment. The detecting unit 43 is configured to detect whether an information identification received by the wireless transceiver unit 41 from update information issued by a wireless AP (when the user equipment 50 is located in a coverage area of the wireless AP) or an information identification in a beacon message received by the wireless transceiver unit 41 that is broadcasted by other user equipment (when the user equipment 50 is located outside the coverage area of the wireless AP) are identical to the information identification of the user equipment 50 or not. If not, the connection establishing unit 45 establishes a connection between the user equipment 50 and the wireless AP or the other user equipment, and then the information update unit 46 receives the update information sent by the wireless AP or update information sent by the other user equipment through the connection, thereby enabling the user equipment 50 to obtain the update information in time.

Besides, an information identification update unit 47 and a user reminding unit 48 may also be disposed in the user equipment 50. The information identification update unit 47 is configured to update the information identification of the current user equipment stored in the information identification storage unit 44 after the wireless transceiver unit 41 receives the update information issued by the wireless AP or the other equipment. The user reminding unit 48 is configured to remind a user to update the information identification stored in the current user equipment when the detecting unit 43 detects that the information identification received by the wireless transceiver unit 41 from the update information issued by the wireless AP and the information identification received by the wireless transceiver unit in a beacon message broadcasted by other user equipment are different from the information identification of the current user equipment. The flexibility of the user equipment may be further enhanced by the user reminding unit 48.

The information identification may be a code for identifying information, such as an information number and a time stamp. For details about a method for the detecting unit 43 to detect the information identifications, reference can be made to the description of the previous embodiment of the present invention.

Figure 6:
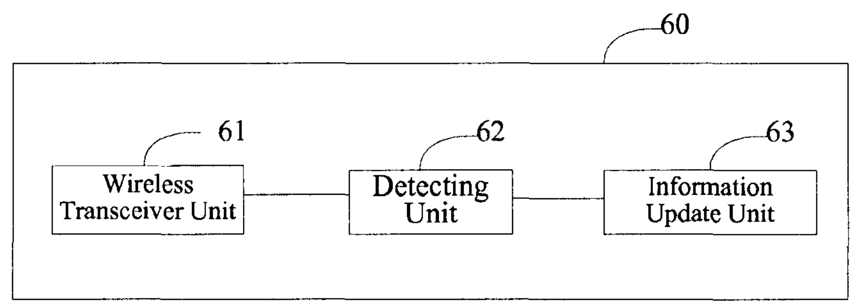
FIG. 6 is a block diagram showing the principles of a user equipment according to a third embodiment of the present invention.

FIG. 6 is a block diagram showing the principles of a user equipment according to a third embodiment of the present invention.

In this embodiment, a user equipment 60 includes a wireless transceiver unit 61, a detecting unit 62, and an information update unit 63. The wireless transceiver unit 61 is configured to receive and send a message. The detecting unit 62 is configured to detect whether an information identification in a beacon message received by the wireless transceiver unit 61 that is broadcasted by other user equipment is identical to an information identification of the user equipment 60 or not. If not, the information update unit 63 receives update information sent by the other user equipment.

The information identification may be a code for identifying information, such as an information number and a time stamp. For details about a method for the detecting unit 62 to detect the information identification, reference can be made to the description of the previous embodiments of the present invention.

In this embodiment of the present invention, the user equipment can not only receive the update information issued by the wireless AP in time when located in the coverage area of the wireless AP, but also know that a neighboring user equipment has an update message through a beacon message issued by the neighboring user equipment after moving outside the coverage area of the wireless AP, and then obtain the update information in time by establishing a connection with the neighboring user equipment.

Figure 7:
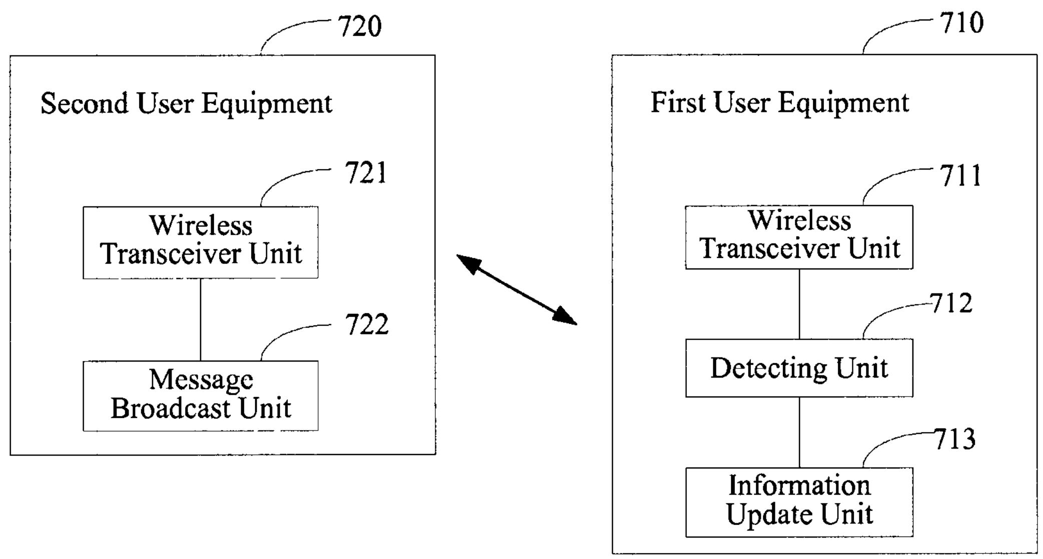
FIG. 7 is a schematic view of an information transmission system according to a first embodiment of the present invention.

FIG. 7 is a schematic view of an information transmission system according to an embodiment of the present invention.

Referring to FIG. 7, a first user equipment 710 at least includes a wireless transceiver unit 711, a detecting unit 712, and an information update unit 713. A second user equipment 720 at least includes a wireless transceiver unit 721 and a message broadcast unit 722.

All user equipments, either outside or within a coverage area of a wireless AP, broadcast beacon messages via wireless transceiver units thereof. The beacon messages include information identification information of the equipments. For example, the wireless transceiver unit 711 of the first user equipment 710 receives a beacon message broadcasted by the message broadcast unit 722 of the second user equipment. The detecting unit 712 of the first user equipment 710 compares the information identification and finds that the information of the first user equipment 710 needs to be updated. The detecting unit 712 of the first user equipment 710 notifies the information update unit 713 to carry out update the information. The first user equipment 710 establishes a connection with the second user equipment 720. The information update unit 713 updates the information according to information received by the first user equipment 710 from the second user equipment 720.

In the present invention, the information update between the user equipment and the wireless AP as well as the other user equipment may be automatically implemented under a configuration (for example, the information update is automatically implemented under a default configuration without any operation by the user). The user may also be reminded to determine whether to perform the update or not (for example, the user is reminded by sound/image to determine whether to perform the update).

Figure 8:
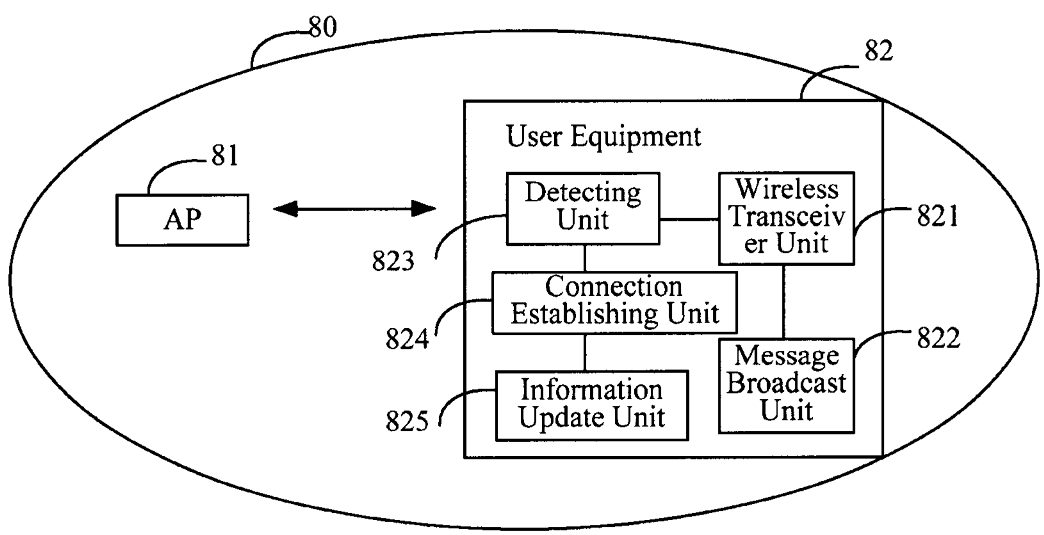
FIG. 8 is a schematic view of an information transmission system according to a second embodiment of the present invention.

FIG. 8 is a schematic view of an information transmission system according to another embodiment of the present invention.

As shown in FIG. 8, the system includes a wireless AP 81 and a user equipment 82 located in a coverage area 80 of the wireless AP 81.

The user equipment 82 includes a wireless transceiver unit 821 and a message broadcast unit 822. The wireless transceiver unit 821 is configured to receive and send a message. The message broadcast unit 822 is configured to periodically generate a broadcast beacon message and send out the broadcast beacon message via the wireless transceiver unit 821.

The user equipment 82 may further include a detecting unit 823, a connection establishing unit 824, and an information update unit 825. The detecting unit 823 is configured to detect whether an information identification received by the wireless transceiver unit 821 from update information issued by the wireless AP is identical to an information identification of the user equipment 82 or not. If not, the connection establishing unit 824 establishes a connection with the wireless AP 81, and the information update unit 825 then receives the update information sent by the wireless AP 81 through the connection.

With the information transmission system according to this embodiment of the present invention, the user equipment within the coverage area of the wireless AP can obtain the update information issued by the wireless AP and then send the update information to the user equipment outside the coverage area of the wireless AP, so that the user equipment outside the coverage area of the wireless AP can also obtain the update information issued by the wireless AP in time. Moreover, since the transmit powers of the wireless AP and the user equipments do not need to be additionally increased, the interference to other user equipments is not increased.

It will be apparent to those skilled in the art that various modifications and variations can be made to the structure of the present embodiment without departing from the scope or spirit of the invention. In view of the foregoing, it is intended that the present embodiment cover modifications and variations of this invention provided that they fall within the scope of the following Claims and their equivalents.

What is claimed is:

1. An information transmission method, comprising:

receiving, by a first user equipment, a beacon message broadcasted by a second user equipment, wherein the beacon message comprising a second information identification stored in the second user equipment;

detecting, by the first user equipment, that the second user equipment has update information through detecting that the second information identification is not identical to a first information identification stored in the first user equipment, wherein each of the first and second information identifications is used to distinguish update information;

establishing, by the first user equipment, a temporary connection with the second user equipment; and receiving, by the first user equipment, the update information from the second user equipment through the temporary connection;

wherein the first and second user equipments are wireless communication devices.

2. The information transmission method according to claim 1, wherein each of the first and second information identifications is one of the group consisting of an information number and a time stamp.

3. The information transmission method according to claim 1, further comprising:

updating, by the first user equipment, the first information identification stored therein, after receiving the update information from the second user equipment.

4. The information transmission method according to claim 1, wherein the first user equipment is located outside a coverage area of a wireless access point (AP), and the second user equipment is located in the coverage area of the wireless AP.

5. A user equipment, which is a first wireless communication device, comprising:

a wireless transceiver unit, configured to receive a beacon message broadcasted by a second wireless communication device, wherein the beacon message contains a second information identification stored in the second wireless communication device;

a detecting unit, configured to detect that the second wireless communication device has update information through detecting that the second information identification is not identical to a first information identification stored in the first wireless communication device, wherein each of the first and second information identifications is used to distinguish update information; and an information update unit, configured to establish a temporary connection with the second wireless communication device and receive the update information from the second wireless communication device through the temporary connection.

6. An information transmission method, comprising:

broadcasting, by a second user equipment, a beacon message, wherein the beacon message comprising a second information identification stored in the second user equipment;

sending, by the second user equipment, update information to a first user equipment through a temporary connection established when the first user equipment receives the beacon message and detects that the second information identification in the beacon message is not identical to a first information identification stored in the first user equipment, wherein each of the first and second information identifications is used to distinguish update information, and the first and second user equipments are wireless communication devices.

7. The information transmission method according to claim 6, before broadcasting, by the second user equipment, the beacon message, the method further comprising:

receiving, by the second user equipment, the update information issued by a wireless access point (AP).

8. The information transmission method according to claim 7, wherein the receiving, by the second user equipment, the update information issued by the wireless AP comprises:

receiving, by the second user equipment, a beacon message comprising a third information identification broadcasted by the wireless AP;

comparing the third information identification with a current information identification stored in the second user equipment;

establishing, by the second user equipment, a connection with the wireless AP if the third information identification and the current information identification stored in the second user equipment are different; and receiving, by the second user equipment, the update information issued by the wireless AP through the established connection.

9. The information transmission method according to claim 8, wherein the establishing, by the second user equipment, the connection with the wireless AP comprises one of the group consisting of:

obtaining, by the second user equipment, channel resources by applying to the wireless AP, thereby establishing the connection with the wireless AP; and obtaining, by the second user equipment, the channel resources by competition, thereby establishing the connection with the wireless AP.

10. The information transmission method according to claim 8, before the second user equipment broadcasts the beacon message, the method further comprising:

reminding the second user equipment to update the current information identification stored therein before the second user equipment establishes the connection with the wireless AP; and establishing, by the second user equipment, the connection with the wireless AP if the second user equipment selects to update the current information identification stored therein.

11. The information transmission method according to claim 7, before the second user equipment broadcasts the beacon message, the method further comprising:

updating, by the second user equipment, the current information identification stored therein after receiving the update information issued by the wireless AP.

12. A user equipment, which is a second wireless communication device, comprising:

a message broadcast unit, configured to periodically generate a beacon message, wherein the beacon message comprising a second information identification stored in the second wireless communication device; and a wireless transceiver unit, is configured to send out the beacon message generated by the message broadcast unit, and further to send update information to a first wireless communication device through a temporary connection established when the first wireless communication device receives the beacon message generated by the message broadcast unit and detects that the second information identification in the beacon message is not identical to a first information identification stored in the first user equipment.

13. The user equipment according to claim 12, wherein the wireless transceiver unit is further configured to receive a beacon message comprising a third information identification broadcasted by a wireless access point (AP), and the user equipment further comprises:

an information identification storage unit, configured to store a current information identification of the second user equipment;

a detecting unit, configured to detect the current information identification is not identical to the third information identification;

a connection establishing unit, configured to establish a connection between the user equipment and the wireless AP, when the current information identification and the third information identification are not identical; and an information update unit, configured to receive the update information issued by the wireless AP.

14. The user equipment according to claim 13, further comprises:

an information identification update unit, configured to update the current information identification of the second user equipment stored in the information identification storage unit after the information update unit receives the update information issued by the wireless AP.

15. The user equipment according to claim 14, further comprises:

a user reminding unit, configured to remind a user to update the current information identification when the detecting unit detects that the current information identification and the third information identification are not identical.

* * * * *